US009191894B2

(12) United States Patent  (10) Patent No.: US 9,191,894 B2
Vukadinovic et al.  (45) Date of Patent: Nov. 17, 2015

(54) POWER SAVING FOR MULTI-HOP COMMUNICATIONS

(71) Applicant: Disney Enterprises, Inc., Burbank, CA (US)

(72) Inventors: Vladimir Vukadinovic, Zürich (CH); Ioannis Glaropoulos, Stockholm (SE); Stefan Mangold, Zürich (CH)

(73) Assignee: Disney Enterprises, Inc., Burbank, CA (US)

( * ) Notice: Subject to any disclaimer, the term of this patent is extended or adjusted under 35 U.S.C. 154(b) by 167 days.

(21) Appl. No.: 14/095,889

(22) Filed: Dec. 3, 2013

(65) Prior Publication Data

US 2015/0029916 A1  Jan. 29, 2015

Related U.S. Application Data

(60) Provisional application No. 61/857,485, filed on Jul. 23, 2013.

(51) Int. Cl.
*G08C 17/00* (2006.01)
*H04W 52/02* (2009.01)

(52) U.S. Cl.
CPC .............................. *H04W 52/0216* (2013.01)

(58) Field of Classification Search
CPC ................... H04W 52/0219; H04W 52/0216; H04W 48/08; H04W 40/24; H04W 80/02; H04W 84/18; H04W 40/26; H04W 48/12; H04L 45/26; H04L 45/00; H04J 3/0641; H04J 3/0661
See application file for complete search history.

(56) References Cited

U.S. PATENT DOCUMENTS

2005/0190759 A1* 9/2005 Lee et al. ...................... 370/389
2007/0147321 A1* 6/2007 Jung ............................. 370/338

OTHER PUBLICATIONS

Seo, et al., "*Fast Flooding in Power Save Mode of IEEE 802.11 DCF Based Mobile Ad Hoc Networks*" Networking 2004, pp. 1464-1469 (May 2004).
Hwang, et al., "*A Novel Efficient Power-Saving MAC Protocol for Multi-Hop MANETs*" International Journal of Communication Systems, pp. 1-22 (Jun. 2011).
Rajagopalan, et al., "*Modified Power Save Model for Better Energy Efficiency and Reduced Packet Latency*" American Journal of Engineering and Applied Sciences, pp. 237-242 (Aug. 2012).

* cited by examiner

*Primary Examiner* — Jung-Jen Liu
(74) *Attorney, Agent, or Firm* — Farjami & Farjami LLP

(57) ABSTRACT

There is provided a system and method for transmitting a data packet from a transmitting device to a destination device using an intermediary device. The transmitting device configured to determine an identity of the destination device, generate an announcement message that includes the identity of the destination device, transmit the announcement message to an intermediary device, receive an acknowledgement message from the intermediary device in response to transmitting the announcement message to the intermediary device, and transmit the data packet to the intermediary device for delivery to the destination device.

18 Claims, 5 Drawing Sheets

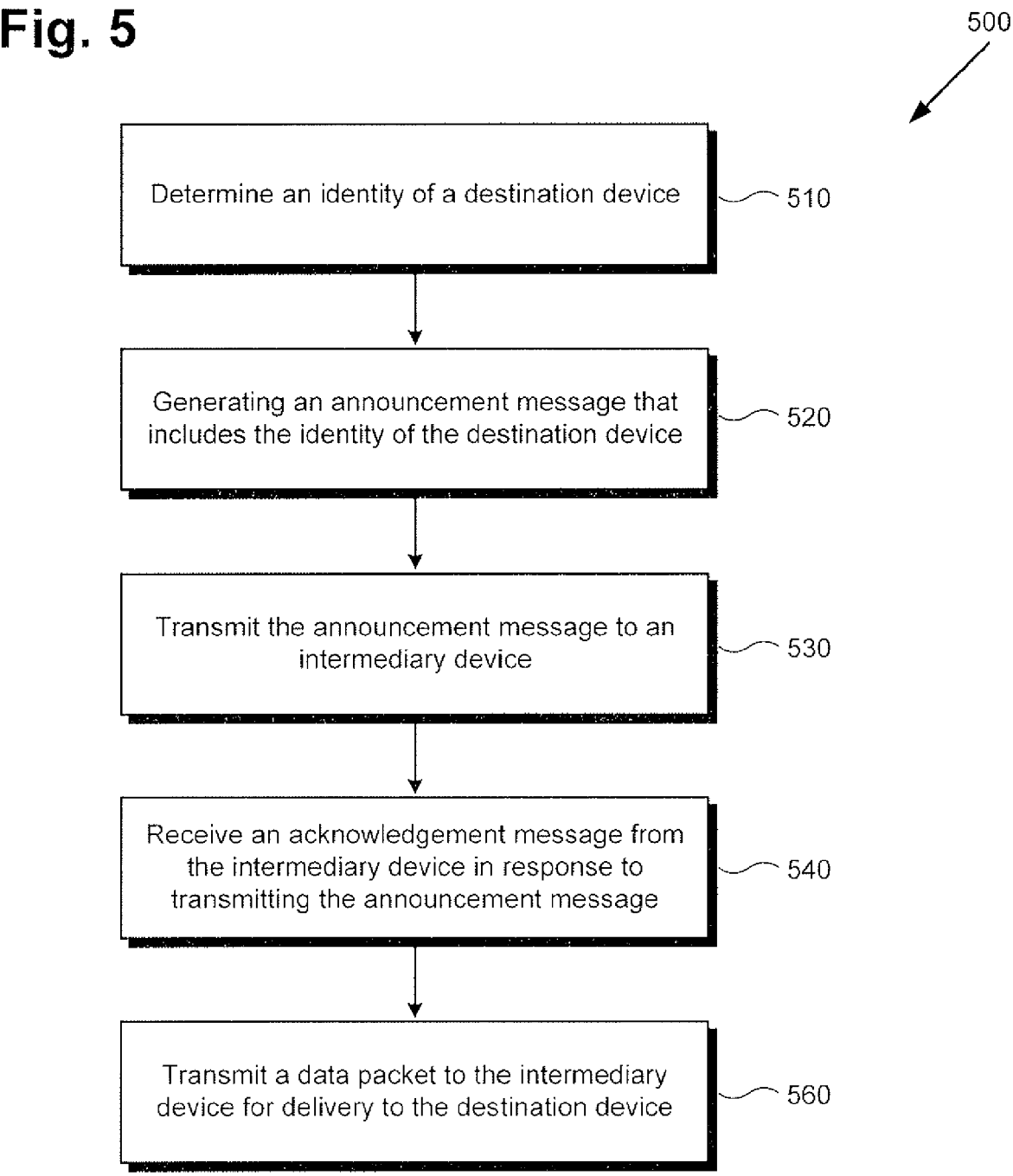

POWER SAVING FOR MULTI-HOP COMMUNICATIONS

RELATED APPLICATIONS

The work leading to this invention has received funding from the European Union Seventh Framework Programme (FP7/2007-2013) under grant agreement no. 288879.

The present application claims the benefit of and priority to a U.S. Provisional Patent Application Ser. No. 61/857,485, filed Jul. 23, 2013 and titled "Enhanced IEEE 802.11 Power Saving for Multi-Hop Toy-To-Toy Communication," which is hereby incorporated by reference in its entirety into the present application.

BACKGROUND

Nowadays almost every desktop computer, laptop, tablet, and smartphone is connected to the Internet and the emergence of the Internet and Things (IoT) will provide global Internet connectivity to a broader variety of devices. Wi-Fi, which is based on the Institute of Electrical and Electronics Engineers' (IEEE) 802.11 standard, dominates the consumer electronics market and any IoT device that needs to connect to smartphones, tablets, televisions, set-top boxes, game consoles, and toys would benefit from Wi-Fi connectivity. Unfortunately, the energy consumption of Wi-Fi is relatively high and can quickly drain the battery of any battery-powered device using a Wi-Fi connection.

To alleviate the problem of power consumption, the IEEE 802.11 standard specifies a Power Saving Mode (PSM) that allows an idle 802.11 device to transition from an awake state to a low-power doze state by switching off the radio transceiver. However, standard PSM is only designed for single-hop communications. As such, when a data packet needs to be forwarded over multiple hops, standard PSM may significantly increase the delivery delay, because only the next-hop device is notified about the pending data packet via traffic announcement. Therefore, devices on subsequent hops will remain in a doze state until the next beacon interval. This causes the data packet to be delayed for multiple beacon intervals before it arrives at the destination device.

SUMMARY

The present disclosure is directed to power saving during a multi-hop transmission of a data packet across multiple devices, substantially as shown in and/or described in connection with at least one of the figures, as set forth more completely in the claims.

BRIEF DESCRIPTION OF THE DRAWINGS

FIG. 5 shows a flowchart illustrating a method for transmitting a data packet from a transmitting device to a destination device by utilizing MH-PSM communication, according to one implementation of the present disclosure.

DETAILED DESCRIPTION

Figure 1:
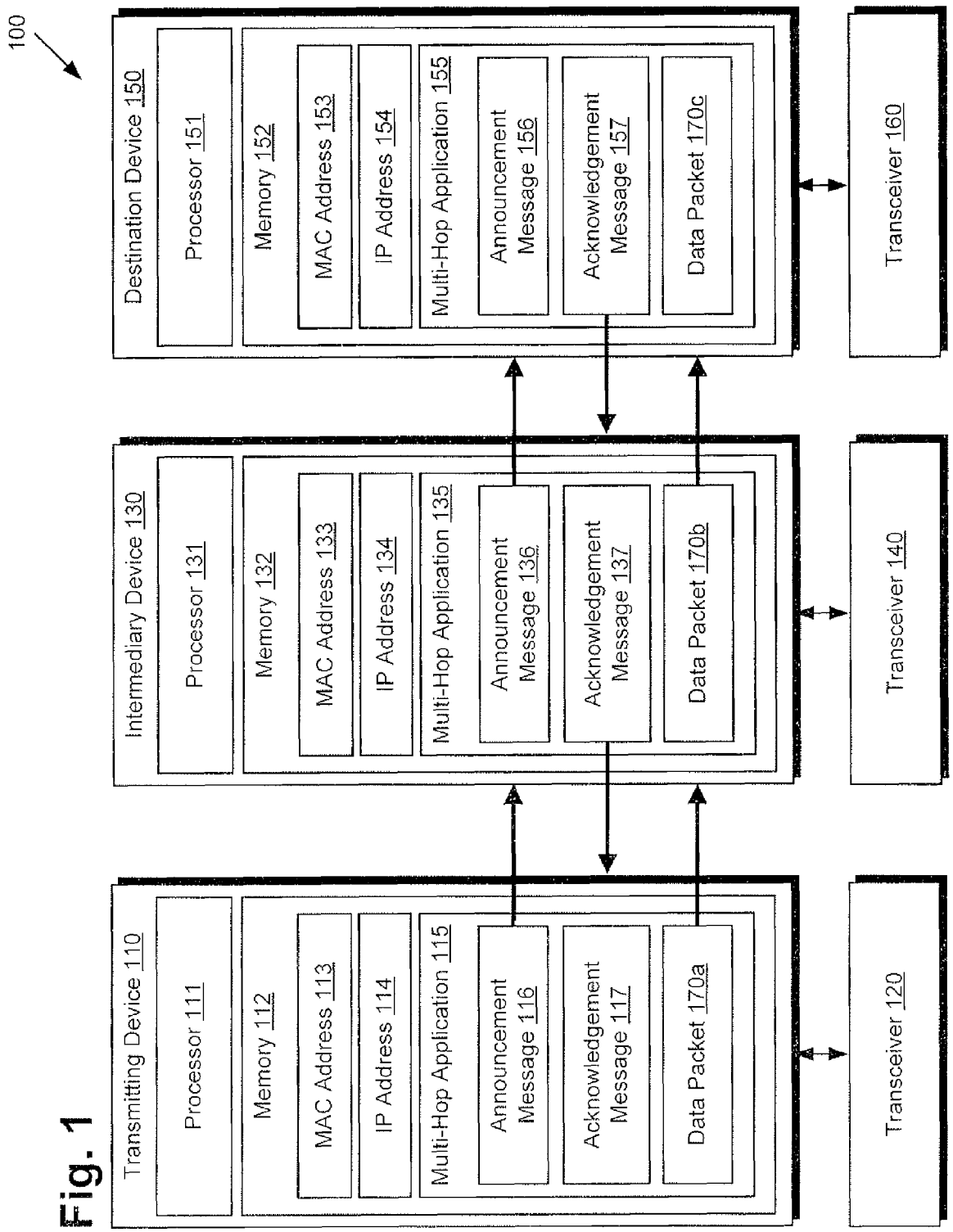
FIG. 1 presents a multi-hop power saving mode (MH-PSM) system for transmitting a data packet from a transmitting device to a destination device, according to one implementation of the present disclosure.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 presents a MH-PSM system for transmitting a data packet from a transmitting device to a destination device, according to one implementation of the present disclosure. System 100 of FIG. 1 includes transmitting device 110, transceiver 120, intermediary device 130, transceiver 140, destination device 150, and transceiver 160. Transmitting device 110 includes processor 111 and memory 112. Memory 112 includes media access control (MAC) address 113, Internet Protocol (IP) address 114, and multi-hop application 115. Multi-Hop application 115 includes announcement message 116, acknowledgement message 117, and data packet 170a. Intermediary device 130 includes processor 131 and memory 132. Memory 132 includes MAC address 133, IP address 134, and multi-hop application 135. Multi-Hop application 135 includes announcement message 136, acknowledgement message 137, and data packet 170b. Destination device 150 includes processor 151 and memory 152. Memory 152 includes MAC address 153, IP address 154, multi-hop application 155. Multi-Hop application 155 includes announcement message 156, acknowledgement message 157, and data packet 170c. Processors 111, 131 and 151 are hardware processors or microprocessors, and memories 112, 132 and 152 are hardware storage devices that may include ROM, RAM, flash memory, or any sufficient device capable of storing data.

As illustrated in FIG. 1, system 100 includes three or more different devices in communication with one another, transmitting device 110, intermediary device 130, and destination device 150. Each of the devices of system 100 may include a personal computer, a mobile phone, a tablet, a video game console, a toy, or any other device capable of communicating with other devices using Wi-Fi or other communication technologies. Furthermore, the implementation of FIG. 1 only shows a single transmitting device 110 utilizing a single intermediary device 130 in order to transmit a data packet to a single destination device 150. However, the implementation of FIG. 1 is not limiting and in other implementations there may be any number of transmitting devices, intermediary devices, and destination devices. For example, in one implementation, system 100 may include one transmitting device, four intermediary devices, and one destination device. In such an implementation, transmitting device would utilize the four intermediary devices in order to send a data packet to the destination device.

As a preliminary matter, the following description gives details about processor 111, memory 112, MAC address 113, IP address 114, multi-hop application 115, announcement message 116, acknowledgement message 117, and transceiver 120 of transmitting device 110. However, it is noted that each of processor 131 memory 132, MAC address 133, IP address 134, multi-hop application 135, announcement message 136, acknowledgement message 137, and transceiver 138 of intermediary device 130, and each of processor 151, memory 152, MAC address 153, IP address 154, multi-hop application 155, announcement message 156, acknowledgement message 157, and transceiver 158 of destination device 120, are also similar to processor 111, memory 112, MAC address 113, IP address 114, multi-hop application 115, announcement message 116, acknowledgement message 117, and transceiver 120 of transmitting device 110, respectively.

Transmitting device 110 includes processor 111 and memory 112. Processor 111 may be configured to access memory 112 to store received input or to execute commands, processes, or programs stored in memory 112, such as multi-hop application 115. Processor 111 may correspond to a processing device, such as a microprocessor or similar hardware processing device, or a plurality of hardware devices. Memory 112 is a sufficient memory capable of storing commands, processes, and programs for execution by processor 111.

Transmitting device 110 further includes MAC address 113 and IP address 114. MAC address 113 includes the identity of transmitting, device 110 and is used as a network address for communications between the devices of system 100. For example, MAC address 113 may include the identity of transmitting device 110, where transmitting device 110 is utilizing an IEEE 802 network. In such an example, other devices using IEEE 802 network technologies can communicate with transmitting device 110 after determining MAC address 113 of transmitting device 110. Other devices can determine MAC address 113 of transmitting device 110 using IP address 114.

There are numerous ways a device can determine MAC address 113 of transmitting device 110 by using IP address 114. One method for determining MAC address 113 of transmitting device 110 is by multi-hop duplicate address detection (DAD), which allows a device to check the uniqueness of IP address 114 in a multi-hop neighborhood, and allows for address resolution. For example, and using system 100 of FIG. 1 where transmitting device 110 is trying to transmit data packet 170a to destination device 150, transmitting device 110 first needs to determine MAC address 153 of destination device 150. To retrieve MAC address 153 of destination device 150, transmitting device 110 first initiates a multi-hop DAD request for IP address 154 of destination device 150. Upon receiving the multi-hop DAD request, destination device 150 responds with a DAD confirmation message that includes MAC address 153 of destination device 150 based on IP address 154. Transmitting device 110 then receives the DAD confirmation with MAC address 153 of the destination device 150. Broadcast IP addresses are straightforwardly resolved into the broadcast MAC address.

Furthermore, in determining the MAC address of a destination device, each device in system 100 may maintain a cache of resolved MAC address to limit multi-hop address resolution. For example, each of transmitting device 110, intermediary device 130, and destination device 150 may maintain a cache of resolved MAC addresses, such as MAC address 113 for transmitting device, MAC address 133 for intermediary device, and MAC address 153 for destination device 150.

Also illustrated in FIG. 1, transmitting device 110 further includes multi-hop application 115 and acknowledgement message 117. Multi-Hop application 115 includes a software application that can be downloaded and stored in memory 112 of transmitting device 110. In the implementation of FIG. 1, multi-hop application 115 is used to generate announcement message 116. Announcement message 116 may correspond to an unicast announcement traffic indication message (ATIM) that includes the MAC address of a destination device, where the destination device corresponds to the device that pending data frames need to be transmitted to. For example, transmitting device 110 may utilize multi-hop application 115 to generate announcement message 116 to announce pending data packet 170a, where data packet 170a needs to be transmitted from transmitting device 110 to destination device 150. Announcement message 116 would thus be generated by transmitting device 110 to include MAC address 153 of destination device 150. By generating announcement message 116 that includes MAC address 153 of destination device 150, both intermediary device 130 and destination device 150 will stay in an awake state during a beacon interval, as will be explained in more detail in regards to FIGS. 2 and 3.

Acknowledgement message 117 may include an ACK packet. Transmitting device 110 may thus use acknowledgement message 117 to signify to other devices that transmitted data or messages have been received. For example, as illustrated in system 100 of FIG. 1, transmitting device 110 may transmit announcement message 116 to intermediary device 130, and in response to intermediary device 130 receiving announcement message 116 from transmitting device 110, intermediary device 130 may transmit acknowledgement message 137 to transmitting device 110. For another example, transmitting device 110 may transmit data packet 170a to intermediary device 130, and in response to intermediary device 130 receiving data packet 170a from transmitting device 110, intermediary device 130 may again transmit acknowledgement message 137 to transmitting device 110.

Also illustrated in FIG. 1 is transceiver 120 in communication with transmitting device 110. In the implementation of FIG. 1, transceiver 120 includes any device that is capable both transmitting data with a transmitter and receiving data with a receiver. For example, transmitting device 110 may run Wi-Fi driver software based on the IEEE 802.11 standards that generates announcement message 116 and acknowledgement message 117. By utilizing transceiver 120, transmitting device 110 is able to transmit messages and data packets to other devices, such as transmitting announcement message 116, acknowledgement message 117, and data packet 170a to intermediary device 130. Transmitting device 110 is also able to receive messages and data packets from other devices, such as receive acknowledgement message 137 from intermediary device 130.

It is noted that transceiver 120 is illustrated as being separate from transmitting device 110 in FIG. 1. In such an implementation, transceiver 120 may be externally attached to transmitting device 110 through a physical or wireless connection. In other implementations, transceiver 120 may be built directly into transmitting device 110. In such implementations, processor 111 of transmitting device 110 would utilize transceiver 120 to both transmit and receive messages and data packets.

Also illustrated in FIG. 1 are data packet 170a of transmitting device 110, data packet 170b of intermediary device 130, and data packet 170c of destination device 150. In the implementation of FIG. 1, each of data packet 170b and data packet 170c corresponds to data packet 170a. For example, transmitting device 110 may transmit data packet 170a from memory 112 to intermediary device 130, and intermediary device 130 may store data packet 170a in memory 132 as data packet 170b. Intermediary device 130 may then transmit data packet 170b from memory 132 to destination device 150, and destination device 150 may store data packet 170b in memory 152 as data packet 170c.

As illustrated in the implementation of FIG. 1, during a single announcement window (illustrated in FIG. 3), transmitting device 110 transmits announcement message 116 to intermediary device 130. As discussed above, announcement message 116 includes MAC address 153 of destination device 150. Intermediary device 130 then transmits acknowledgement message 137 to transmitting device 110 to signal to transmitting device 110 that announcement message 116 was received by intermediary device 130. Intermediary device 130 then generates announcement message 136 to include MAC address 153, which was identified from announcement message 116. After intermediary device 130 has generated announcement message 136, intermediary device 130 transmits announcement message 136 to destination device 150 and receives acknowledgement message 157 from destination device 150 in response to destination device 150 receiving announcement message 136. By having transmitting device 110 transmit announcement message 116 to intermediary device 130, and having intermediary device 130 transmit announcement message 136 to destination device 150 during a single announcement window, each of transmitting device 110 intermediary device 130, and transmitting device 150 will stay in an awake state (luring the following data window.

The data window is a set period of time for which each of the devices is now able to transmit data packets, such as data packets 170a-c, to other devices. For example, as illustrated in FIG. 1, transmitting device 110 transmits data packet 170a to intermediary device 130 and receives a second acknowledgement message 137 from intermediary device 130 in response to intermediary device receiving data packet 170a. Intermediary device 130 then transmits data packet 170b to destination device 150 and receives a second acknowledgement message 157 from destination device 150 in response to destination device 150 receiving data packet 170b. The transmitting of announcement messages and data packets during a beacon interval is described in more detail with regards to FIG. 3.

It should be noted that the implementation of FIG. 1 only illustrates one intermediary device 130, however, the implementation of FIG. 1 is not limiting. In other implementations, intermediary device 130 of system 100 can include any number of intermediary devices. In such implementations, each intermediary device would perform the same functions as intermediary device 130 from FIG. 1. For example, each of the intermediary devices may receive an announcement message that includes MAC address 153 of destination device 150, generate an announcement message that includes MAC address 153, and transmit the generated announcement message to either another intermediary device or to destination device 153.

Figure 2:
FIG. 2 presents the structure of an announcement traffic indication message, according to one implementation of the present disclosure.

FIG. 2 presents the structure of an announcement traffic indication message, according to one implementation of the present disclosure. Announcement message 216 of FIG. 2 includes first address 280, second address 281, and third address 282. Announcement message 216 further includes frame control, duration, sequence control, and frame check sequence (FCS). With regards to FIG. 2, it should be noted that announcement message 216 corresponds to each of announcement message 116, announcement message 136, and announcement message 156 from FIG. 1.

As illustrated in FIG. 2, announcement message 216 includes three different address fields, first address 280, second address 281, and third address 282, In the implementation of FIG. 2, first address 280 includes an identity of a device receiving announcement message 216, second address 281 includes an identity of a device transmitting announcement message 216, and third address 282 includes an identity of a destination device that a pending data packet is intended for. For example, and using the implementation of FIG. 1, suppose transmitting device 110 wants to transmit data packet 170a to destination device 150 using intermediary device 130. Transmitting device 110 would generate announcement message 116 using multi-hop application 115, Announcement message 116 would include MAC address 133 of intermediary device 130 in the first address field, MAC address 113 of transmitting device 110 in the second address field, and MAC address 153 of destination device 150 in the third address field.

By generating announcement message 116 using three different address fields, transmitting device 110 is able to notify intermediary device 130 that a pending data packet intended for destination device 150 is about to be transmitted by transmitting device 110. For example, and sticking with the example above of transmitting device 110 trying to transmit data packet 170a to destination device 150 using intermediary device 130, intermediary device 130 would inspect the third address field of announcement message 116 after intermediary device receives announcement message 116. Intermediary device 130 would then utilize multi-hop application 135 to generate announcement message 136 to include MAC address 153 of destination device 150, where MAC address 153 was identified from inspecting the third address field of announcement message 116. Announcement message 136 would thus include MAC address 153 of destination device 150 in the first address field, MAC address 133 of intermediary device 130 in the second address field, and MAC address 153 of destination device 150 in the third address field. Destination device 150 may then receive announcement message 136 from intermediary device 130 and inspect the third address field of announcement message 136 to determine that destination device 150 is the intended device for a pending data packet.

After intermediary device 130 receives announcement message 116 from transmitting device 110, and destination device 150 receives announcement message 136 from intermediary device 130, each of transmitting device 110, intermediary device 130, and destination device 150 is configured to stay in an awake state during the entire beacon interval. Transmitting device 110 is able to then transmit data packet 170a to destination device 150 using intermediary device 130.

Figure 3:
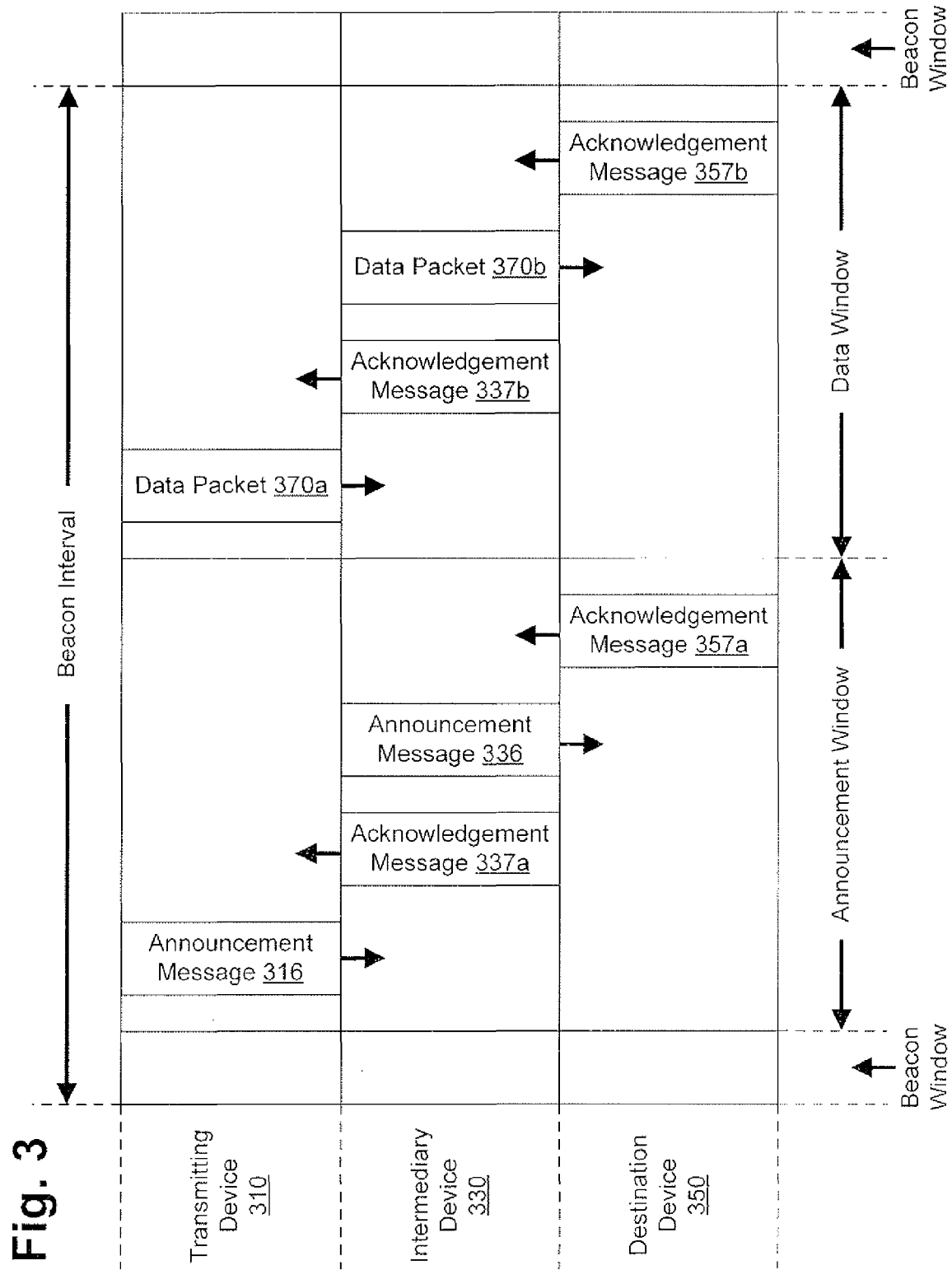
FIG. 3 presents an example beacon interval during a MH-PSM communication, according to one implementation of the present disclosure.

FIG. 3 presents an example beacon interval during a MH-PSM communication, according to one implementation of the present disclosure. FIG. 3 includes transmitting device 310, announcement message 316, intermediary device 330, announcement message 336, acknowledgement message 337a, acknowledgement message 337b, destination device 350, acknowledgement message 357a, acknowledgement message 357b, data packet 370a, and data packet 370b. FIG. 3 also includes an example beacon interval, which includes a beacon window, an announcement window, and a data window. Furthermore, FIG. 3 includes a second beacon window to show the start of second beacon interval.

With regards to FIG. 3, it should be noted that transmitting device 310, announcement message 316, intermediary device 330, announcement message 336, destination device 350, data packet 370a, and data packet 370b, correspond respectively to transmitting device 110, announcement message 116, intermediary device 130, announcement message 136, destination device 150, data packet 170a, and data packet 170b of FIG. 1. It should further be noted that both acknowledgement message 337a and acknowledgement message 337b, and both acknowledgement message 357a and acknowledgement message 357b of FIG. 3 correspond respectively to acknowledgement message 137 and acknowledgement message 157 of FIG. 1.

As illustrated in FIG. 3, a beacon interval includes a beacon window, an announcement window, and a data window. During the beacon window, each device switches from a doze state to an awake state and starts a back-off procedure to attempt to transmit a beacon to other devices. If a station receives a beacon from another device before its back-off procedure time expires, the receiving station cancels its beacon transmission. A timing synchronization function (TSF) then uses the time-stamped beacons to synchronize clocks among the devices to ensure that all the devices enter the awake state at the same time. For example, at the start of the beacon window, each of transmitting device 310 intermediary device 330, and destination device 350 would switch from a doze state into an awake state and start a back-off procedure in an attempt to transmit a beacon. After each of the transmitting device 310, intermediary device 330, and destination device 350 have either transmitted a beacon or received a beacon from another device, each device will stay in the awake state during the announcement window.

The announcement window is a period of the beacon interval when devices attempt to transmit announcement messages to other devices. As discussed above, announcement messages notify a neighboring device that a transmitting device is trying to transmit a pending data packet either to the neighboring device itself, or to the neighboring device so that the neighboring device can transmit that same data packet to another device. The announcement message notifies the neighboring device to stay in the awake state during the data window. Each device that does not transmit an announcement message to another device or receive an announcement message from another device may go back to the doze state after the announcement window to save power. For example, if transmitting device 310 is trying to send a pending data packet to destination device 350 by using intermediary device 330, transmitting device 310 will send announcement message 316 to intermediary device 330 and intermediary device 330 will send announcement message 336 to destination device 350 during the announcement window.

The data window is a period during the beacon interval when devices attempt to transmit pending data packets to other devices. Each transmitting device that sent an acknowledged announcement message to a neighboring device will attempt to next transmit the pending data packet to that same neighboring device. For example, and using the same example as above, transmitting device 310 will transmit data packet 370a to intermediary device 330, and intermediary device 330 will transmit data packet 370a as data packet 370b to destination device 350. As discussed above with reference to FIG. 1, data packet 370b corresponds to data packet 370a, except that data packet 370a is being transmitted from transmitting device 310 and data packet 370b is being transmitted from intermediary device 330.

As illustrated in the implementation of FIG. 3, transmitting device 310 is able to transmit data packet 370a to destination device 350 in one beacon interval. This is because, as discussed above, transmitting device 310 transmits announcement message 316 to intermediary device 330 during the announcement window, where announcement message 316 includes the MAC address of destination device 350. Intermediary device 330 is able to receive announcement message 316 and inspect the third address field of announcement message 316 to retrieve the MAC address of destination device 350. Intermediary device 330 then generates and transmits announcement message 336 to destination device 350 during the same announcement window as announcement message 316 was transmitted. By transmitting both announcement message 316 and announcement message 336 during the announcement window of the beacon interval, transmitting device 310, intermediary device 330, and destination device 350 will remain in the awake state during the data window. Transmitting device 310 is then able to transmit data packet 370a to destination device 350 using intermediary device 330 during the data window.

It is noted that the MH-PSM communication includes backward-compatibility with standard PSM since MH-PSM does not violate frame formats or protocol operations. Instead, devices that implement standard PSM will not check the third address field of received announcement messages and, therefore, the "wave" of announcement messages will end at a device that is implemented with standard PSM. For example, suppose a system includes a transmitting device implemented with MH-PSM, a first intermediary device implemented with MH-PSM, a second intermediary device implemented with standard PSM, a third intermediary device implemented with MH-PSM, a fourth intermediary device implemented with MH-PSM, and a destination device implemented with MH-PSM. If the transmitting device tries to transmit a pending data packet to the destination device during a first beacon interval, the transmitting device generates and transmits a first announcement message that includes the third address field to the first intermediary device, and the first intermediary device generates and transmits a second announcement message that includes the third address field to the second intermediary device during the first beacon interval. However, the second intermediary device would not generate and transmit a third announcement message to the third intermediary device during the first beacon interval. Instead, the second intermediary device will wait for the data packet to arrive and generate and transmit the third announcement message to the third intermediary device during a second beacon interval. This is because both the transmitting device and the first intermediary device are implemented with MH-PSM, but the second intermediary device is implemented with standard PSM.

Once the third intermediary device receives the third announcement message and the data packet during the second beacon interval, two different scenarios can occur to get the pending data packet to the destination device. This occurs because the third announcement message will not contain a third address field with the MAC address of the destination device since the second intermediary device that generated the third announcement message is implemented with standard PSM.

In a first scenario, all of the downstream devices will fall back to running standard PSM. For example, and sticking with the example above, each of the third intermediary device, the fourth intermediary device, and the destination device will fall back to running standard PSM. As such, after the third intermediary device receives the third announcement message and the data packet during the second beacon interval, the third intermediary device will generate and transmit a fourth announcement message, along with the data packet, to the fourth intermediary device during a third beacon interval. Next, the fourth intermediary device will generate and transmit a fifth announcement message, along with the data packet, to the destination device during a fourth beacon interval. As such, in the first scenario, it will take four beacon intervals for the transmitting device to transmit the pending data packet to the destination device.

In a second scenario, the first downstream device implemented with MH-PSM to receive an announcement message and data packet from a device implemented with standard PSM will re-create the third address field and re-start the "wave" of announcement messages. The first downstream device can re-create the third address field by determining the MAC address of the destination device using the same methods as the transmitting device discussed above. For example, and sticking with the example above, after the third intermediary device receives the third announcement message and the data packet from the second intermediary device, the third intermediary device will generate and transmit a fourth announcement message, that includes the MAC address of the destination device in the third address field, to the fourth intermediary device during a third beacon interval. The fourth intermediary device will then inspect the third address field of the fourth announcement message and generate and transmit a fifth announcement message, which includes the third address field, to the destination device during the third beacon interval. Finally, and still during the third beacon interval, the third intermediary device will transmit the data packet to the fourth intermediary device and the fourth intermediary device will transmit the data packet to the destination device. As such, in the second scenario, it will take three beacon intervals for the transmitting device to transmit the pending data packet to the destination device.

Figure 4:
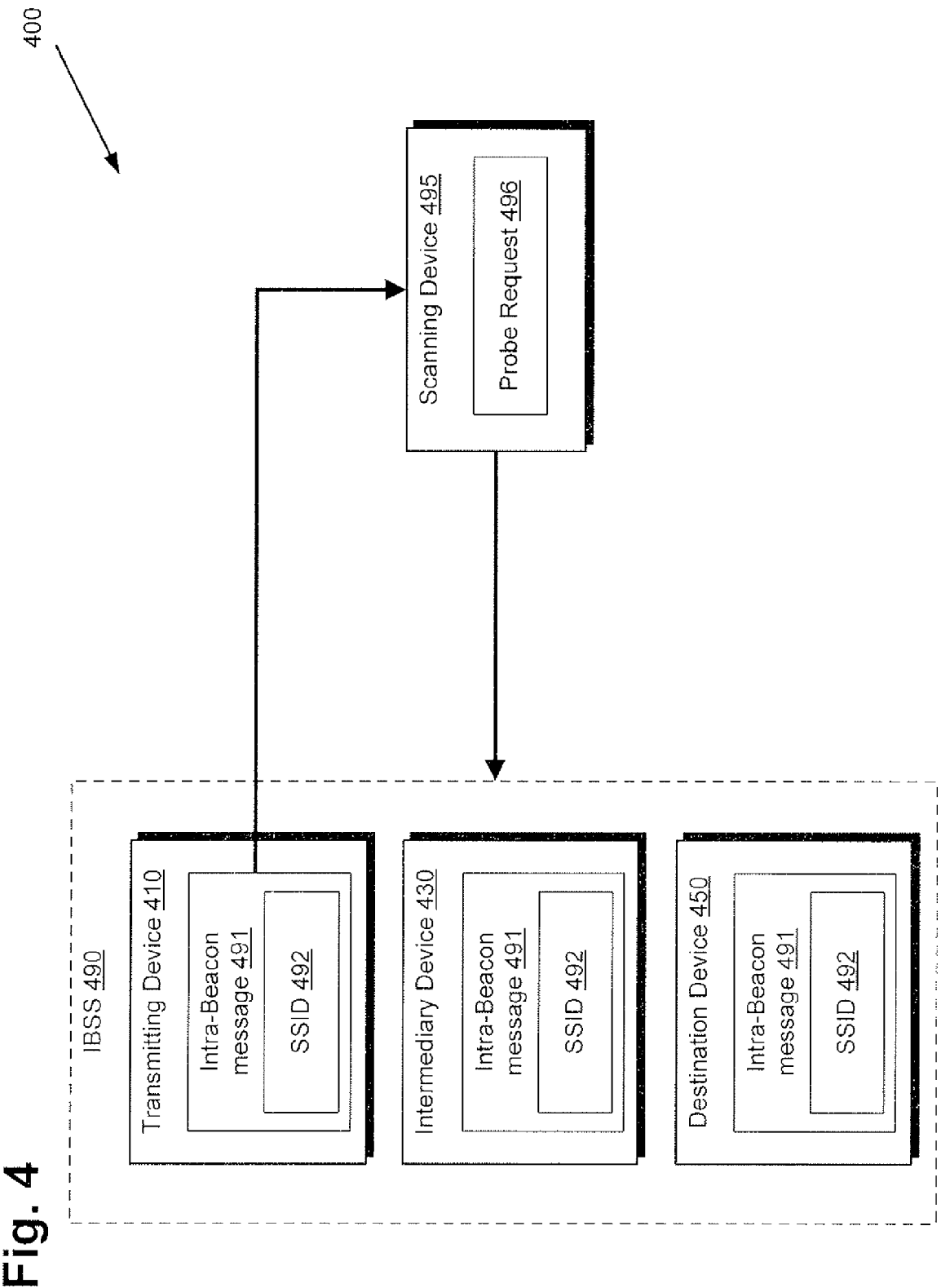
FIG. 4 presents a system that implements a sleep on beacon transmission (SORT), according to one implementation of the present disclosure.

FIG. 4 presents a system that implements SOBT, according to one implementation of the present disclosure. System 400 of FIG. 4 includes independent basic service set (IBSS) 490 and scanning device 495. IBSS 490 includes transmitting device 410, intermediary device 430, and destination device 450. Each of transmitting device 410, intermediary device 430, and destination device 450 include intra-beacon message 491, which includes service set identifier (SSID) 492. Scanning device 495 includes probe request 496. With regards to FIG. 4, it should be noted that transmitting device 410, intermediary device 430, and destination device 450 correspond respectively to transmitting device 110, intermediary device 130, and destination device 150 of FIG. 1, and transmitting device 310, intermediary device 330, and destination device 350 of FIG. 3.

As illustrated in FIG. 4, transmitting device 410, intermediary device 430, and destination device 450 are included in IBSS 490. Furthermore, each of transmitting device 410, intermediary device 430, and destination device 450 include intra-beacon message 491. Intra-Beacon message 491 is a message that is transmitted by the devices in IBSS 490 and is used to notify scanning devices of IBSS 490. As illustrated in FIG. 4, intra-beacon 491 includes SSID 492, where SSID 492 identifies IBSS 490. As such, any scanning device that receives intra-beacon message 491 can discover IBSS 490 by SSID 492.

Also illustrated in FIG. 4, scanning device 495 includes probe request 496. Probe request 496 is a message transmitted by scanning device 495 when scanning device 495 is actively seeking an IBSS. For example, as illustrated in 4, scanning device 495 is not part of IBSS 490. In order for scanning device 495 to discover IBSS 490, scanning device 495, employing active scanning, will periodically switch from a doze state to an awake state in order to transmit probe request 495. Devices that receive probe request 495 will then transmit a message to scanning device 495 in order to notify scanning device 495 of an IBSS.

In the implementation of FIG. 4, where devices are implemented with SOBT, transmitting device 410 has transmitted intra-beacon message 491 and scanning device 495 has received intra-beacon message 491. However, in SOBT, transmitting device 410 transmits intra-beacon message 491 periodically during a beacon interval. For example, transmitting device 410 may periodically switch from a doze state to an awake state during a single beacon interval. Each time transmitting device 410 switches to an awake state, transmitting device 410 transmits intra-beacon message 491 so that any scanning device within the range of intra-beacon message 491 can receive intra-beacon message 491 and discover IBSS 490 by SSID 492. By periodically switching from the doze state to the awake state during the single beacon interval, transmitting device 410 does not have to stay in the awake state during the entire beacon interval and thus, saves power. As such, devices implementing SOBT have a huge advantage over devices not implementing SOBT, as devices not implementing SOBT are configured to stay in the awake mode during the entire beacon interval to listen for and respond to probe requests. Staying in the awake state during an entire beacon interval causes devices not implementing SOBT to use an unnecessary amount of power during each beacon interval.

It should be noted that the implementation FIG. 4 only illustrates transmitting device 410 as transmitting intra-beacon message 491 to scanning device, however, this implementation is not limiting. In other implementations, any of transmitting device 410, intermediary device 430, and destination device 450 may transmit intra-beacon message 491. Furthermore, the devices of IBSS 490 may switch for each beacon interval which device is to transmit intra-beacon message 491. Additionally, when selecting which device transmits intra-beacon message 491, the transmitting device is the device that both wins the beacon back-off and subsequently transmits a regular beacon (as discussed above with reference to FIG. 3), and does not receive or transmit any announcement messages during the announcement window.

FIG. 5 shows a flowchart illustrating a method for transmitting a data packet from a transmitting device to a destination device by utilizing MH-PSM communication, according to one implementation of the present disclosure. The approach and technique indicated by flowchart 500 are sufficient to describe at least one implementation of the present disclosure, however, other implementations of the disclosure may utilize approaches and techniques different from those shown in flowchart 500. Furthermore, while flowchart 500 is described with respect to FIG. 1, the disclosed inventive concepts are not intended to be limited by specific features shown and described with respect to FIG. 1. Furthermore, with respect to the method illustrated in FIG. 5, it is noted that certain details and features have been left out of flowchart 500 in order not to obscure the discussion of inventive features in the present application.

Referring now to flowchart 500 of FIG. 5, flowchart 500 includes determining an identity of a destination device (510). For example, processor 111 of transmitting device 110 can determine MAC address 153 of destination device 150. As discussed above, processor 111 can determine MAC address 153 by utilizing IP address 154 of destination device 150.

Flowchart 500 also includes generating an announcement message that includes the identity of the destination device (520). For example, processor 111 of transmitting device 110 may execute multi-hop application 115 to generate announcement message 116 that includes MAC address 153 of destination device 150. As discussed above, announcement message 116 may include an ATIM with three different address fields. MAC address 153 of destination device 150 may thus be included in the third address field of announcement message 116. The third address field of announcement message 116 notifies any intermediary devices, such as intermediary device 130, of the destination of pending data packets to be transmitted by transmitting device 110.

Flowchart 500 also includes transmitting the announcement message to an intermediary device (530). For example, processor 111 of transmitting device 110 can transmit announcement message 116 to intermediary device 130 by utilizing transceiver 120. As discussed above, transmitting device 110 may run Wi-Fi driver software based on the IEEE 802.11 standards. By utilizing transceiver 120, transmitting device 110 is able to transmit messages to other devices, such as transmitting announcement message 116 to intermediary device 130.

Flowchart 500 also includes receiving an acknowledgement message from the intermediary device in response to transmitting the announcement message (540). For example, processor 111 of transmitting device 110 may receive acknowledgement message 137 from intermediary device 130 in response to transmitting device 110 transmitting announcement message 116 to intermediary device 130. As discussed above, acknowledgement message 137 may include an ACK message that notifies transmitting device 110 that intermediary device 130 received announcement message 116.

Furthermore, after transmitting acknowledgement message 137 to transmitting device 110, processor 131 of intermediary device 130 may utilize multi-hop application 135 to generate announcement message 136 that also includes MAC address 153 of destination device 150. Intermediary device 130 may then utilize transceiver 140 to transmit announcement message 136 to destination device 150 during the same beacon interval that announcement message 116 was transmitted. Intermediary device 130 then receives acknowledgement message 157 from destination device 150 in response to transmitting announcement message 136 to destination device 150.

Flowchart 500 also includes transmitting a data packet to the intermediary device for delivery to the destination device (150). For example, processor 111 of transmitting device 110 may utilize transceiver 120 to transmit data packet 170*a* to intermediary device 130. Processor 111 of transmitting device 110 may then receive acknowledgement message 136 a second time from intermediary device 130 in response to transmitting data packet 170*a* to intermediary device 130. Acknowledgement message 137 is sent a second time from intermediary device 130 to notify transmitting device 110 that intermediary device 130 received data packet 170*a*.

Furthermore, intermediary device 130 may utilize transceiver 140 to transmit data packet 170*a* received from transmitting device 110 to destination device 150 as data packet 170*b*. Intermediary device 130 may then receive a second acknowledgement message 157 from destination device 150 to notify intermediary device 130 that destination device 150 received data packet 170*b*. As discussed above, both data packet 170*a* being transmitted from transmitting device 110, and data packet 170*b* being transmitted from intermediary device 130, are transmitted during a data window of a single beacon interval.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. An intermediary device comprising:
a processor configured to:
  receive a first announcement message from a transmitting device within a beacon interval;
  transmit a first acknowledgement message to the transmitting device within the beacon interval, in response to receiving the first announcement message;
  determine an identity of a destination device from the first announcement message within the beacon interval;
  generate a second announcement message that includes the identity of the destination device within the beacon interval;
  transmit the second announcement message to the destination device within the beacon interval;
  receive a second acknowledgement message from the destination device within the beacon interval, in response to transmitting the second announcement message to the destination device;
  receive a data packet from the transmitting device within the beacon interval after receiving the second acknowledgement; and
  transmit the data packet to the destination device within the beacon interval.

2. The intermediary device of claim 1, wherein each of the first announcement message and the second announcement message includes an announcement traffic indication message (ATIM).

3. The intermediary device of claim 1, wherein the identity of the destination device includes a media access control (MAC) address.

4. The transmitting intermediary device of claim 1, wherein the transmitting device transmits the data packet to the destination device within the beacon interval.

5. The intermediary device of claim 1, wherein the transmitting device transmits the first announcement message to the intermediary device using Wi-Fi.

6. A system for transmitting a data packet across a plurality of devices, the system comprising:
a transmitting device;
an intermediary device; and
a destination device;
the intermediary device configured to:
receive a first announcement message from the transmitting device within a beacon interval;
transmit the first acknowledgement message to the transmitting device within the beacon interval, in response to receiving the first announcement message;
determine an identity of the destination device from the first announcement message within the beacon interval;
generate a second announcement message using that includes the identity of the destination device within the beacon interval; and
transmit the second announcement message to the destination device within the beacon interval;
receive the second acknowledgement message from the destination device within the beacon interval;

receive the data packet from the transmitting device within the beacon interval after receiving the second acknowledgement; and transmit the data packet to the destination device within the beacon interval.

7. The system of claim 6, wherein the intermediary device includes a plurality of intermediary devices, and wherein each of the plurality of intermediary devices is configured to receive, generate, and transmit an announcement message using the identity of the destination device.

8. The system of claim 6, wherein the first announcement message and the second announcement message includes an ATIM.

9. The system of claim 6, wherein the identity of the destination device includes a MAC address.

10. The system of claim 6, wherein the intermediary device is further configured to transmit the first acknowledgement message to the transmitting device in response to receiving the first announcement message from the transmitting device within the beacon interval, and the destination device is further configured to transmit the second acknowledgement message to the intermediary device in response to receiving the second announcement message from the intermediary device within the beacon interval.

11. The system of claim 6, wherein the intermediary device is further configured to transmit the data packet to the destination device within the beacon interval.

12. The system of claim 6, wherein the transmitting device transmits the first announcement message to the intermediary device using Wi-Fi.

13. A method for transmitting a data packet from an intermediary device, the method comprising:

receiving a first announcement message from a transmitting device within a beacon interval;

transmitting a first acknowledgement message to the transmitting device within the beacon interval, in response to receiving the first announcement message;

determining an identity of a destination device from the first announcement within the beacon interval;

generating a second announcement message that includes the identity of the destination device within the beacon interval;

transmitting the second announcement message to the destination device within the beacon interval;

receiving a second acknowledgement message from the destination device within the beacon interval, in response to transmitting the second announcement message to the destination device;

receiving a data packet from the transmitting device within the beacon interval after receiving the second acknowledgement message; and transmitting the data packet to the destination device within the beacon interval.

14. The method of claim 13, wherein the first announcement message includes an ATIM.

15. The method of claim 13, wherein the identity of the destination device includes a MAC address.

16. The method of claim 13, wherein before the transmitting device transmits the data packet to the intermediary device, the intermediary device is configured to generate the second announcement message including the identity of the destination device and transmit the second announcement message to the destination device.

17. The method of claim 16, wherein the transmitting device, the intermediary device, and the destination device remain in an awake state for the beacon interval.

18. The method of claim 13, wherein the transmitting device transmits the first announcement message to the intermediary device using Wi-Fi.

* * * * *

UNITED STATES PATENT AND TRADEMARK OFFICE
CERTIFICATE OF CORRECTION

PATENT NO. : 9,191,894 B2  
APPLICATION NO. : 14/095889  
DATED : November 17, 2015  
INVENTOR(S) : Vukadinovic et al.

It is certified that error appears in the above-identified patent and that said Letters Patent is hereby corrected as shown below:

In the claims,

Column 12, line 42, "The transmitting intermediary" should be changed to --The intermediary--

Column 12, line 63, "interval; and" should be changed to --interval;--

Column 13, line 21, "is further configured" should be changed to --is configured--

Signed and Sealed this
Twenty-sixth Day of April, 2016

Michelle K. Lee
*Director of the United States Patent and Trademark Office*